W. H. COLDWELL.
LAWN MOWER.
APPLICATION FILED MAR. 14, 1912.
1,039,490.
Patented Sept. 24, 1912.
5 SHEETS—SHEET 5.
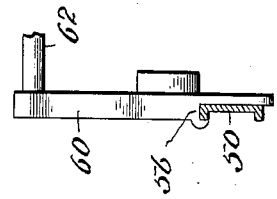
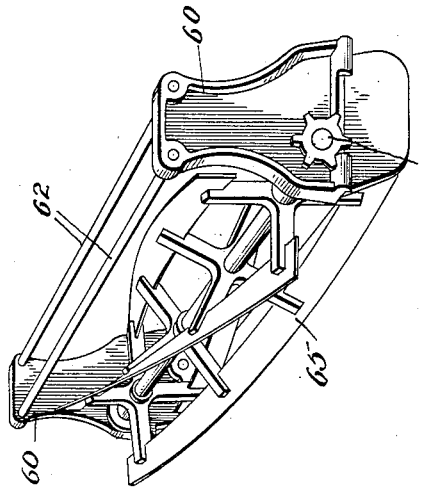
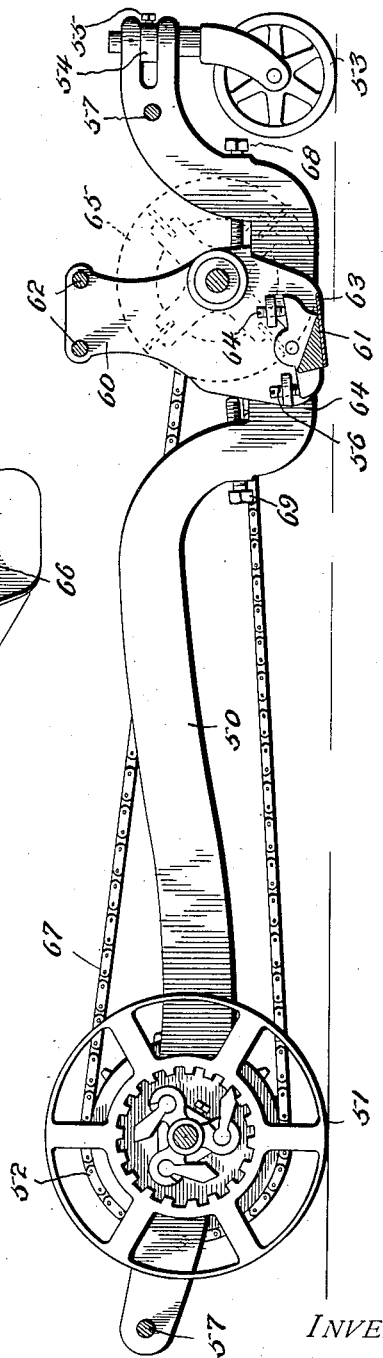

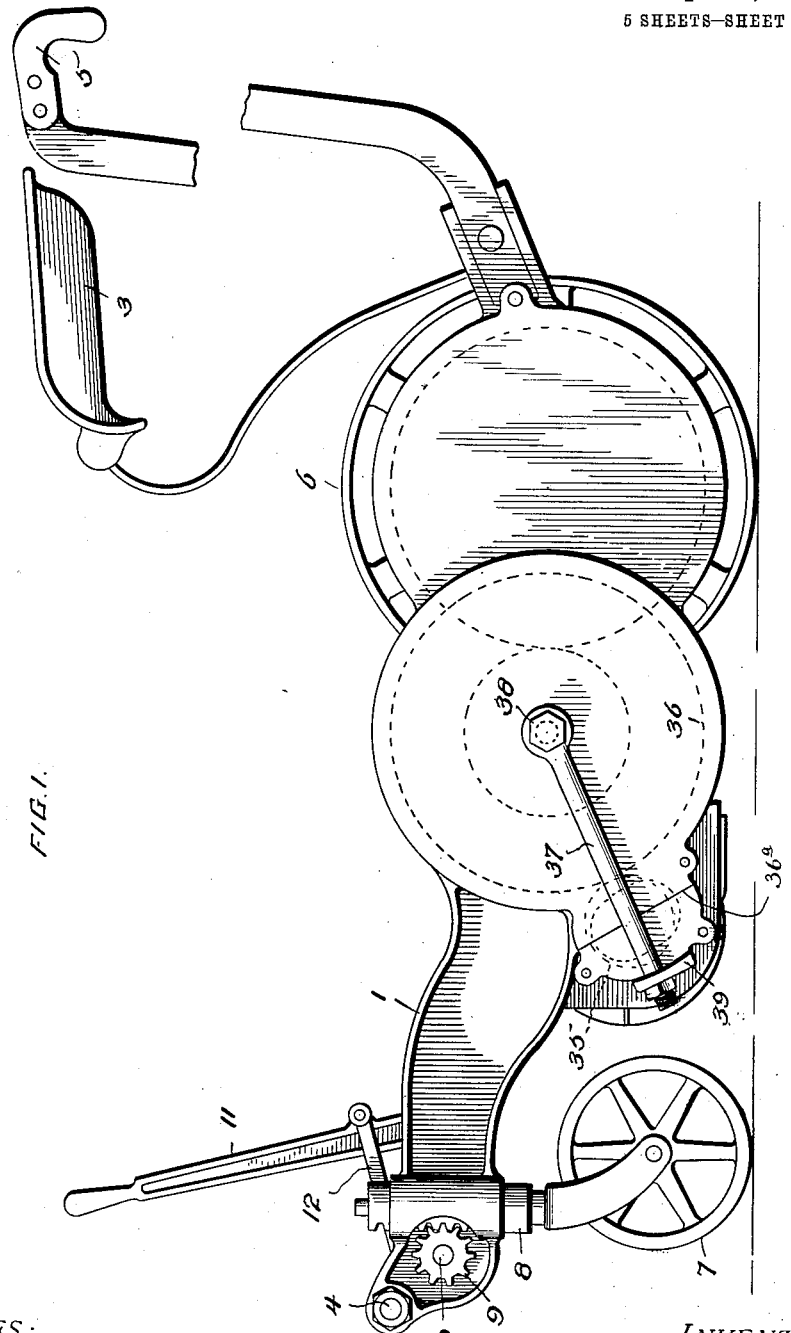

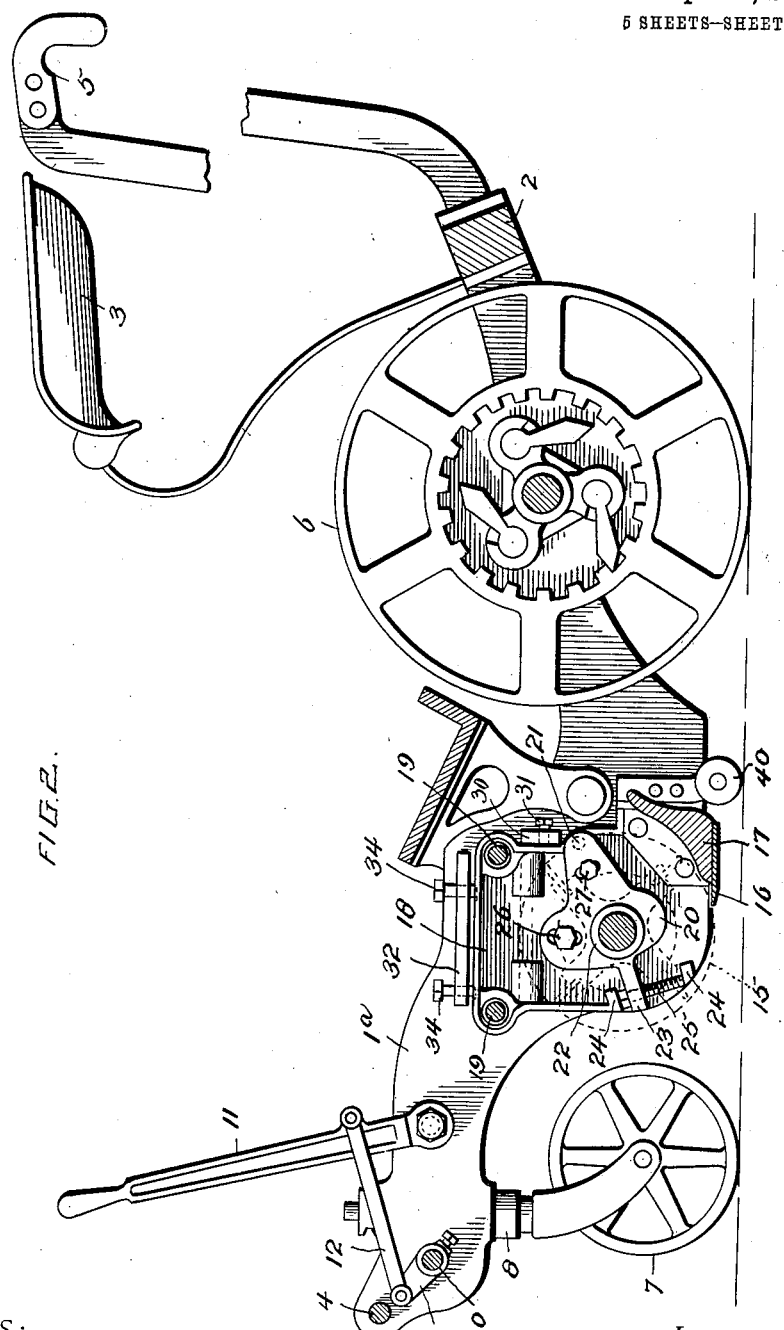

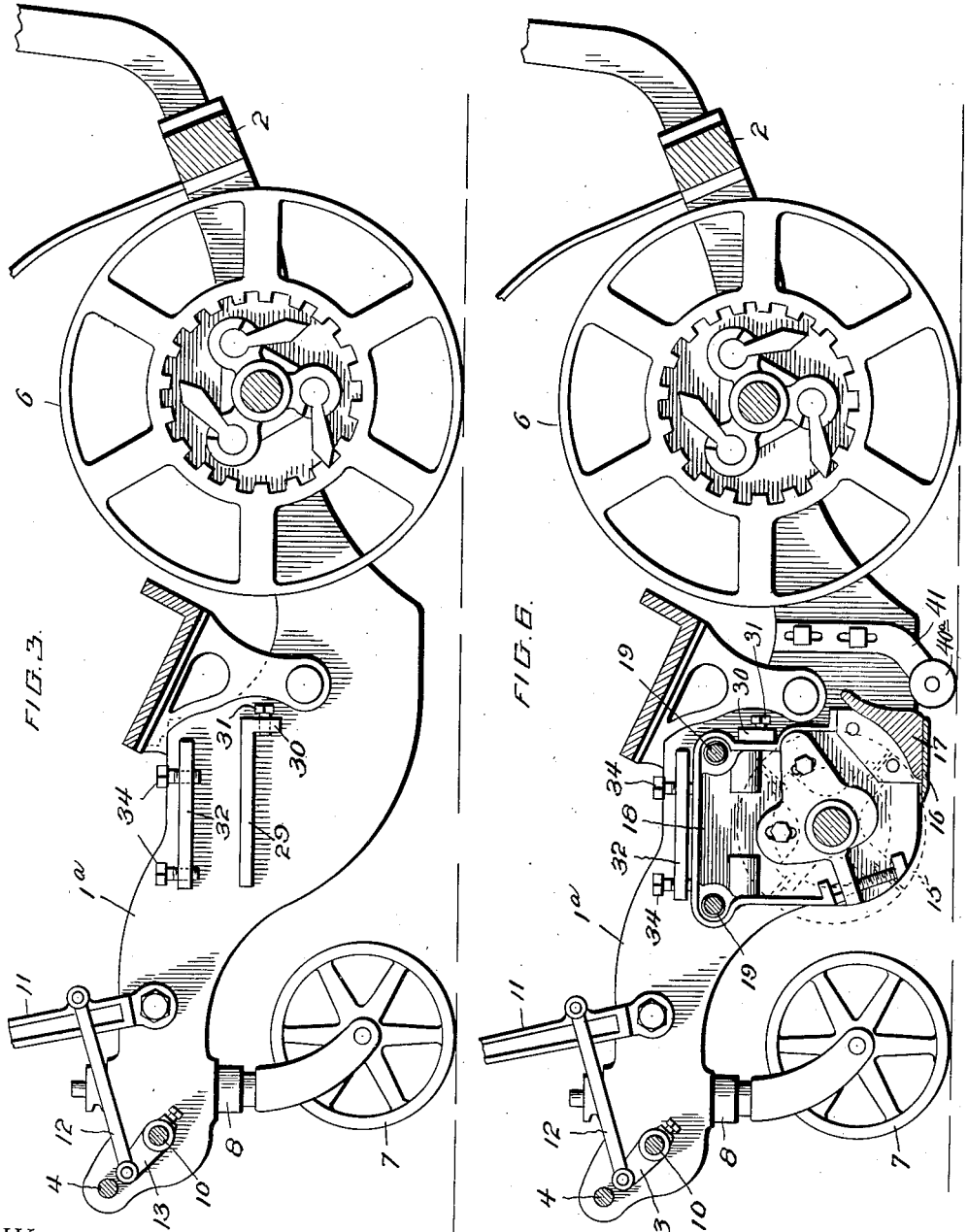

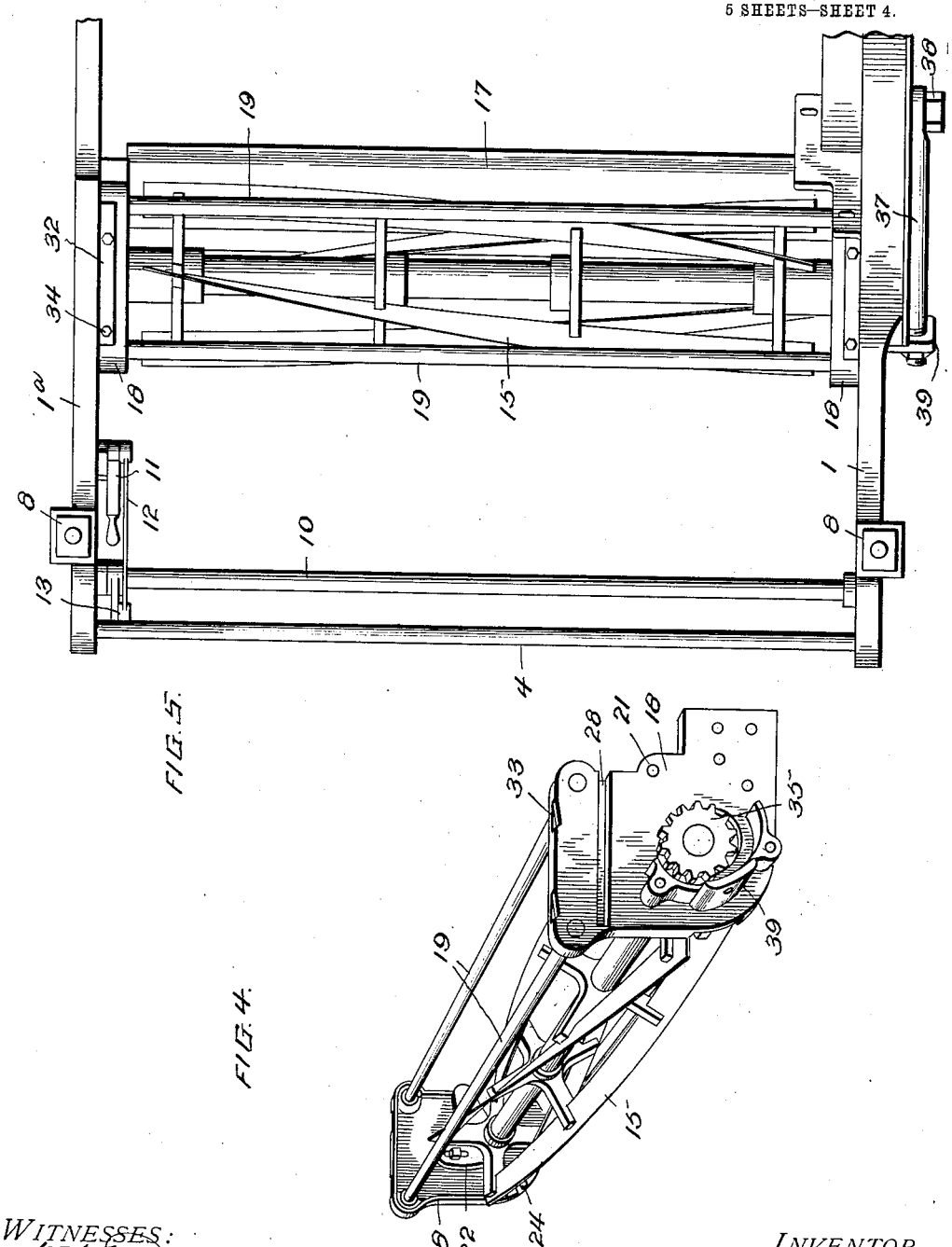

UNITED STATES PATENT OFFICE.

WILLIAM H. COLDWELL, OF NEWBURGH, NEW YORK.

LAWN-MOWER.

1,039,490.

Specification of Letters Patent.   Patented Sept. 24, 1912.

Application filed March 14, 1912. Serial No. 683,738.

*To all whom it may concern:*

Be it known that I, WILLIAM H. COLDWELL, a citizen of the United States, residing at Newburgh, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention consists in the novel features hereinafter described reference being had to the accompanying drawings which show two embodiments of the invention, which I have selected for purposes of illustration, and the said invention is fully disclosed in the following description and claims.

Referring to the said drawings, Figure 1 represents a side elevation of a horse lawn mower having my invention embodied therein. Fig. 2 represents a longitudinal vertical sectional view of the same. Fig. 3 is a partial longitudinal sectional view of the machine with the demountable cutter unit removed. Fig. 4 is a detail perspective view of the demountable cutter unit detached. Fig. 5 is a partial top plan view of the machine with the demountable cutter in place. Fig. 6 is a longitudinal sectional view of a horse lawn mower embodying my invention, showing a slight modification. Fig. 7 is a longitudinal sectional view of a hand lawn mower showing my invention embodied therein. Fig. 8 is a detail view of the demountable cutter unit removed. Fig. 9 is a detail sectional view showing the means for securing the demountable cutter unit in position.

The object of my invention is to provide a demountable cutter unit for lawn mowers, comprising the rotary cutter, the stationary knife and only sufficient framing, to hold the cutter and knife in operative relation with each other at all times whether the cutter unit is in place in the frame or removed therefrom. The cutter carrying frame, which is the frame carrying and supporting the cutting mechanism during its operation and which may be the frame of a hand mower, or horse mower, or the cutter carrying frame of a motor lawn mower (as distinguished from the motor carrying frame thereof) is provided with suitable means for receiving and seating the cutter unit frame, so that it can be placed in position, without adjustment with respect to the other parts of the machine, and means are provided for securing the cutter unit in the mower frame or cutter carrying frame, and preferably for locking or securing it rigidly with respect to the same.

A number of extremely advantageous results are obtained by this novel construction. For example, in the use of lawn mowers, in case the stationary knife or knife bar becomes bent, or other repairs to the cutting mechanism become necessary, the entire machine must be sent to the factory for repairs, thus putting the machine out of use, and necessitating the transportation of the heavy machine in order to repair the cutting mechanism which forms a small portion of the weight. This is particularly objectionable in the case of horse lawn mowers the weight of which is very great and its shipment is attended with expense and annoyance. The shipment of the entire machine to the factory is necessitated by the fact that the structure of the cutting mechanism of lawn mowers as constructed prior to my invention does not admit of the cutting mechanism being removed except by disassembling the machine and separating the rotary cutter and stationary knife. These parts cannot be advantageously removed from or replaced in the machine except by an experienced workman, skilled in the accurate adjustment of the cutting mechanism.

By my improved construction the cutter unit can be removed, returned to the factory, repaired and placed in perfect adjustment and returned, when it can be placed in its proper position in the machine by an unskilled operator. If desired, a new cutter unit can be used in place of one sent in for repairs, so that the machine itself will not be put out of use. Moreover, the lawn mowers can be supplied with two or more cutter units of the same or different styles, that is to say having rotary cutters provided with a greater or less number of blades, for example, to adapt the cutter units for different classes of work, and one cutter unit can be quickly and easily substituted for another, in the machine, thus adapting the machine for different kinds of cutting, and also enabling the machine to be used continuously.

In Figs. 1 to 5 inclusive, I have shown my invention embodied in a horse lawn mower. In these figures, the main frame of the mower comprises two side frames 1, 1ª connected by suitable transversely disposed devices which brace the side frames, and hold them at the proper distance apart. These transverse spacing and bracing devices include the back girt 2, which also serves as a support for the seat 3, and a tie rod 4. Any desired number of tie rods or other transverse braces may be employed. The rear portion of the frame is also provided preferably with guiding handles 5, 5. In the mower frame is mounted the drive roller which is preferably made in two sections in the usual manner to facilitate turning, said sections being connected to the drive shaft by the well known pawl and ratchet mechanism, by means of which the shaft is driven only when the roller is revolved in a forward direction. At its front end the frame is provided with vertically adjustable caster wheels 7, 7, the vertical spindles of which are in this instance, pivotally mounted in blocks 8 movable vertically in recesses in the frame and provided with racks, engaged by pinions 9, 9 on a transverse shaft 10. 11 represents a lever pivoted to one of the side frames and operatively connected with the shaft 10, by means of a link 12 and crank arm 13, for raising and lowering the frame on the caster wheels, to regulate the height of cut, and also to raise the cutting mechanism out of operative relation to the ground when desired, as in driving the machine to and from a lawn or field. The demountable cutter unit for this machine is shown detached in Fig. 4 and consists of the rotary cutter 15, the stationary knife 16, supported by the knife bar 17, and two small side plates 18, which may be made integrally with the knife bar, but are preferably formed separately, and bolted thereto, said side plates carrying the bearings for the rotary cutter. The side plates may also be connected by one or more tie rods 19, two of such tie rods being shown herein. I prefer to provide the cutter unit with means, carried thereby, for adjusting the rotary cutter with respect to the stationary knife. In this instance each of the plates 18 is provided with a bearing hanger 20 pivoted to the plate at 21 by means of a stud or bolt, and having a bearing 22 for the rotary cutter shaft, the side plates 18 being provided with slots considerably larger than the cutter shaft to accommodate the adjustment of the same. In order that the adjustment may be very minute each hanger is provided with a lug 23, through which an adjusting screw 25 extends, the ends of which engage lugs 24, 24 on the adjacent side plate 18. By turning these screws 25 a very delicate adjustment of the cutting mechanism may be effected and the hangers are preferably rigidly clamped to the plates 18, in adjusted position by means of bolts 26, 27 extending through slots in the hanger and engaging threaded apertures in the side plate of the framing of the demountable cutter unit. I do not, however, limit myself to this form of adjusting mechanism, as any form of adjusting mechanism which will accomplish the result desired may be substituted therefor. In this embodiment of the invention, each of the side plates 18 is shown provided with a horizontally disposed recess or groove 28 constructed to engage horizontal guiding and supporting ribs 29, 29 formed on the inner faces of the side frames 1 and 1ª for holding the cutter unit in operative position in the mower frame. I prefer to provide means for positively and adjustably limiting the movement of the cutter unit in the frame in order to definitely determine its exact position therein, and for this purpose I have shown the side frames 1, 1ª provided with stop lugs 30, extending downwardly from the guiding and supporting ribs 29, adjusting screws 31 being preferably provided in said lugs as shown, to engage the rear ends of the plates 18, 18 of the cutter unit and arrest them when the said cutter unit is in the desired position. The set screws may in some instances be omitted if desired. I also prefer to provide means for locking the cutter unit in its operative position, which means is readily detachable by one not specially skilled in the use of tools. In the present instance I have shown each side frame provided on its inner face with a horizontally disposed web 32 located above the plane of the upper edges of the cutter unit side plates 18, the latter being provided with inclined shoulders 33 extending downwardly and rearwardly and located in position to be engaged by a set screw or set screws 34 extending through threaded apertures in the web 32. I do not, however, limit myself to these constructions for supporting and locking the cutter unit as they may be greatly varied without departing from the invention.

The rotary cutter may be driven in any suitable manner from the driving roller shaft either by chains, a gear train or other form of gearing, and it will be understood that the shaft of the rotary cutter will preferably be provided with one member of such driving gearing, which is connected to and disconnected from the other members when the cutter unit is placed in the frame or removed therefrom. In the present instance I have shown a construction in which a gear train connects the driving roller with the rotary cutter, the said train being constructed and arranged in any usual or well known way, and the gears being protected by suitable gear boxes or cases. The shaft of the rotary cutter is provided with a pinion 35 secured thereto, and adapted to be brought into and out of mesh with the next gear of the train, in this instance an intermediate gear 36 (deriving its motion from the driving roller) as the cutter unit is slid into place, or removed from the frame. To this end the gear casing of the gear 36 is cut away at 36ª to expose the teeth of the gear, and permit the pinion 35 to engage the same. The pinion 35 is also protected by a gear casing carried by the cutter unit which joins the casing for gear 36, when the cutter unit is in position. The stop lugs 30 (where the set screws 31 are omitted) are so located as to arrest the cutter unit when the gear 36 and pinion 35 are in proper mesh, and where the set screws 31 are employed they may be adjusted with great nicety to insure the proper mesh of these gears.

In order to more positively hold the pinion 35 and gear 36 in mesh, I prefer to provide a stretcher 37, consisting in this instance of an eye bolt connected at one end to the cutter carrying frame, in this case by a screw 38 secured to the gear casing, and having its other end connected to the cutter unit. In this case the bolt 37 is passed through an aperture in a lug 39 cast on the adjacent side plate 18 of the cutter unit and a nut is provided which engages a threaded portion of the bolt. A stretcher may be used at each side of the machine if desired, but it will ordinarily be sufficient to employ it at the side adjacent to the driving gearing.

In the embodiment of my invention just described, to remove the cutter unit, it is only necessary to slack off the set screws 33 and remove the nut on the stretcher 37, when the cutter unit can be entirely removed from the mower frame and replaced therein without affecting the relative positions of the parts of the cutting mechanism or disturbing any other parts of the machine in any way. When the cutter unit is in place and secured in position it forms a transversely spacing and bracing device between the side frames 1 and 1ª and assists in strengthening the main frame of the mower.

In order to prevent injury to the cutting mechanism, I prefer to provide the usual guard roller 40 which may be secured to the cutter unit in rear of the stationary knife bar, and being vertically adjustable therein as shown in Figs. 1 to 5 inclusive or it may be supported by arms 41, 41 as shown at 40ª in Fig. 6, said arms being adjustably secured to the side frames of the mower frame.

In Figs. 7 and 8, I have shown my invention embodied in a hand lawn mower in which 50, 50 represent the lateral frame bars connected by suitable tie rods 57, 57 supported at their rear end by the driving roller or rollers 51, the shaft of which carries in this instance a driving sprocket 52. The frame bars are supported at their forward ends by the usual caster wheels 53, 53 which are adjustable vertically in a well known manner by means of collars 54 and set screws 55. The frame bars 50 are each provided with a horizontally disposed portion or seat 56 to receive the demountable cutter unit. The demountable cutter unit comprises the two side plates 60, 60 connected by the stationary knife bar 61 and tie rods 62, the former carrying the stationary knife 63 and being in this instance pivotally hung between said plates and being adjustable by means of set screws 64, 64 on the end plates, which engage the bar on opposite sides of the pivotal connection of the bar with the side plates. The rotary cutter 65 is mounted in the side plates and the shaft provided at one end with a sprocket wheel 66, connected by suitable chain 67 with the driving sprocket 52. The side plates are preferably provided with channeled portions which fit down upon the supporting seats 56 of the frame bars 50 and the cutter unit is rigidly locked in position by means of horizontally disposed set screws 68, 69 extending through threaded apertures in the frame bars forward of and in rear of the seats 56 and engage the edges of the side plates, which are slightly tapered upwardly, so that the set screws will firmly secure the cutter unit in place in the frame. The rear set screws 69 will act as stops to fix the position of the cutter unit, and its adjustment with respect to the driving chain, and the cutter unit can be removed by merely loosening the two front screws 68, 68, lifting the cutter unit, and detaching the sprocket from the sprocket chain thereof, which may be done without uncoupling the chain, thereby retaining the adjustment of the rear screws 69, and enabling the operator to set the cutter unit exactly to its place. The frame 50 is provided with a suitable handle by means of which it may be pushed along over the ground.

It will be obvious to those skilled in the art that the demountable cutter unit may be adapted to any style or type or form of lawn mowing machine, provided with stationary knife and rotary cutter, and I, therefore, desire to claim the demountable cutter unit broadly without being limited to the specific constructions herein shown and described by means of which my invention is carried into effect in the two instances selected for purposes of illustration.

What I claim and desire to secure by Letters Patent is:—

1. A demountable cutter unit for the cutter carrying frame of a lawn mower, comprising a rotary cutter, a stationary knife, and a framing adapted to be removably seated in and secured to the cutter carrying frame, and provided with means for holding the rotary cutter and stationary knife in operative relation, whereby the said cutter unit can be removed from and placed in the cutter carrying frame, without disturbing the relation of the said rotary cutter and stationary knife.

2. A demountable cutter unit for the cutter carrying frame of a lawn mower, comprising a rotary cutter, a stationary knife and a framing adapted to be removably seated in and secured to the cutter carrying frame, said framing being provided with devices for holding the rotary cutter and stationary knife in operative relation, and adjusting mechanism for adjusting the relation of said cutter and knife, whereby the cutter unit can be removed from and placed in the cutter carrying frame without disturbing the adjustment of the rotary cutter and stationary knife.

3. A demountable cutter unit for the cutter carrying frame of a lawn mower, comprising side plates adapted to fit and be removably secured to the cutter carrying frame, a transverse knife bar rigidly connected with said side plates independently of the said carrying frame, a stationary knife secured to said knife bar, a rotary cutter carried by said side plates independently of the said carrying frame, and adjusting devices carried by said side plates, for adjusting the relation of the rotary cutter and the stationary knife, whereby said cutter unit may be removed from or placed in said cutter carrying frame without disturbing the adjustment of said cutter and knife.

4. A demountable cutter unit for the cutter carrying frame of a lawn mower, comprising a rotary cutter, a stationary knife, a framing removably secured to and forming part of the cutter carrying frame, said framing holding said cutter and knife in operative relation at all times, the said rotary cutter being provided with a gear member, for engaging and forming part of the cutter driving mechanism of the mower, when the cutter unit is in operative position, whereby the cutter unit can be removed from and placed in said cutter carrying frame without disturbing the relation of the rotary cutter and the stationary knife.

5. In a lawn mower, the combination with the cutter carrying frame, provided with means for receiving and seating a cutter unit, of a demountable cutter unit comprising a rotary cutter, a stationary knife and a light framing provided with seating portions to removably engage the seating means of the cutter carrying frame, said framing holding the rotary cutter and stationary knife in operative relation at all times, and means for rigidly securing said framing to the cutter carrying frame, when seated therein.

6. In a lawn mower, the combination with the cutter carrying frame, of a demountable cutter unit, comprising a rotary cutter, a stationary knife and a framing removably engaging the carrying frame for supporting the said cutter and knife in operative relation with each other, coöperating devices on said cutter carrying frame and the framing of the cutter unit for determining the position of the cutter unit in said frame, the parts of said coöperating devices carried by one of said frames having adjustable members for engaging the other frame, and means for rigidly securing the cutter unit in said cutter carrying frame.

7. In a lawn mower, the combination with the cutter carrying frame, provided with means for receiving and supporting a cutter unit, and adjustable stops for determining the position of said cutter unit in said frame, of a demountable cutter unit comprising a rotary cutter, a stationary knife and framing for holding said cutter and knife in operative relation to each other, said framing having means for removably engaging the receiving and supporting means on the carrying frame and said adjustable stops, and devices for securing said cutter unit framing rigidly to the said carrying frame.

8. In a lawn mower, the combination with the cutter carrying frame, comprising side frames, and transverse spacing and bracing devices, and means for supporting the said frame at a distance above the ground, including rotary ground engaging devices, of a demountable cutter unit, comprising a rotary cutter, a stationary cutter and a transversely disposed frame removably engaging the carrying frame for holding said cutter and knife in operative relation, and means for rigidly securing the cutter unit between the side frames of the carrying frame, whereby the cutter unit becomes a transverse spacing and bracing device for said frame.

9. The combination with a cutter carrying frame, of rotary ground engaging devices for supporting the frame, and driving mechanism for the rotary cutter operatively connected with certain of said rotary ground engaging devices, of a demountable cutter unit, consisting of a rotary cutter, a stationary cutter, and a framing for holding said cutters in operative relation with each other, said framing removably engaging the carrying frame, said rotary cutter carrying an element of said driving mechanism, whereby said cutter unit can be removed from and replaced in the cutter carrying frame, without disturbing the relation of the cutters.

10. The combination with a cutter carrying frame, of rotary ground engaging devices for supporting the frame, and driving mechanism for the rotary cutter operatively connected with certain of said rotary ground engaging devices, of a demountable cutter unit, consisting of a rotary cutter, a stationary cutter, and a framing for holding said cutters in operative relation with each other, said framing removably engaging the cutter carrying frame, said rotary cutter carrying an element of said driving mechanism, and means for rigidly securing the said cutter unit in position in the cutter carrying frame, with the gear member carried by the cutter unit in operative engagement with the driving mechanism carried by the cutter carrying frame, whereby said cutter unit can be removed from said frame and from engagement with the driving mechanism carried thereby without disturbing the relation of the cutters.

11. In a lawn mower, the combination with the cutter carrying frame, comprising side frames, each provided with a horizontally disposed supporting portion, of a demountable cutter unit comprising a rotary cutter, a stationary knife and a framing for holding said parts in operative relation, said framing being provided with supporting portions to removably engage the supporting portions of said side frames, and locking means movable in a direction toward said cutter unit for locking the same in engagement with said supporting devices.

12. In a lawn mower, the combination with the cutter carrying frame, comprising the side frames, each provided with a horizontally disposed supporting portion, of a demountable cutter unit comprising a rotary cutter, a stationary knife and a framing for holding said parts in operative relation, said framing being provided with horizontal grooves for engaging the said ribs, and locking screws carried by said side frames, for engaging the cutter unit and holding it in engagement with the cutter carrying frame.

13. In a lawn mower, the combination with the cutter carrying frame thereof provided with rotary ground engaging devices, for supporting the frame including a driving roller, and gearing for driving the rotary cutter operatively connected with and driven by said roller, of a demountable cutter unit comprising a rotary cutter, a stationary knife and a framing removably engaging the cutter carrying frame for holding said cutter and knife in operative relation, said rotary cutter carrying a disconnectible member of said driving gearing, means for locking the demountable cutter in the cutter carrying frame with its disconnectible gear member in engagement with a gear member carried by said frame, and an auxiliary device for connecting the cutter carrying frame and the cutter unit adjacent to said gearing.

14. In a lawn mower, the combination with the cutter carrying frame thereof, provided with rotary ground engaging devices for supporting the frame including a driving roller, and gearing for driving the rotary cutter operatively connected with and driven by said roller, of a demountable cutter unit comprising a rotary cutter, a stationary knife and a framing removably engaging said cutter carrying frame for holding said cutter and knife in operative relation, said rotary cutter carrying a disconnectible member of said driving gearing, means for locking the demountable cutter in the cutter carrying frame, with its disconnectible gear member in engagement with a gear member carried by said frame, and a disconnectible stretcher, connected at one end to the cutter carrying frame and at the other end to the cutter unit, adjacent to said gearing.

15. In a lawn mower, the combination with the cutter carrying frame comprising side frames, provided on their inner faces with horizontally disposed supporting ribs, locking screws adjacent thereto, and stops for engaging the cutter unit, of a demountable cutter unit comprising a rotary cutter, a stationary knife and a framing for holding said cutter and knife in operative relation, including side plates provided with horizontally disposed grooves for engaging said supporting ribs, and inclined portions to receive the said locking screws.

16. In a lawn mower, the combination with the cutter carrying frame, comprising connected side frames, supporting driving rollers and caster wheels connected to said cutter carrying frame, gearing operatively connected with the driving rollers, said side frames being provided with horizontally disposed supporting ribs, of a demountable cutter unit comprising a rotary cutter, a stationary knife, and a framing holding said cutter and knife in operative relation and provided with grooves to engage said supporting ribs, said rotary cutter having its shaft provided with a pinion for engaging one of the gear members carried by the cutter carrying frame, means for locking the framing of the cutter unit to said side frames, and a stretcher located adjacent to said driving gearing and connecting the cutter carrying frame and cutter unit framing, to hold said pinion and gear member in engagement.

17. In a lawn mower, the combination with the cutter carrying frame having its side frames provided with horizontally disposed supporting ribs and locking screws located adjacent thereto and stops for limiting the movement of the cutter unit on said ribs in one direction, of a demountable cutter unit, comprising a rotary cutter, a stationary knife and a framing holding said cutter and knife in operative relation, said framing being provided with grooved portions for engaging the said ribs, and having screw engaging faces inclined in a direction to force the cutter unit toward said stops when engaged by the locking screws.

18. In a lawn mower, the combination with the cutter carrying frame, provided with means for supporting a cutter unit, and driving gearing for the rotary cutter thereof, of a demountable cutter unit comprising a stationary knife, a rotary cutter and a framing removably engaging the said cutter carrying frame and holding said cutter and knife at all times in operative relation with each other, and a gear member connected with said rotary cutter, said cutter carrying frame and said cutter unit being provided the one with positioning devices for engaging the other to hold said cutter unit in such position that the gear member connected with the rotary cutter is in proper predetermined relation with the parts of the driving gearing carried by the cutter carrying frame.

19. In a lawn mower, the combination with the cutter carrying frame, provided with means for supporting a cutter unit, and driving gearing for the rotary cutter thereof, of a demountable cutter unit comprising a stationary knife, a rotary cutter and a framing holding said cutter and knife at all times in operative relation with each other, and a gear member connected with said rotary cutter, and adjustable stops for limiting the relative movement of said cutter unit and cutter carrying frame, in placing the latter in position, when the gear member connected with the rotary cutter is in proper predetermined relation with the parts of the driving gearing carried by the cutter carrying frame.

20. In a lawn mower, the combination with the cutter carrying frame, provided with means for supporting a cutter unit, and driving gearing including a driving gear wheel, of a demountable cutter unit, comprising a stationary knife, a rotary cutter and a framing holding said knife and cutter at all times in operative relation with each other, a pinion connected with said rotary cutter and adapted to engage said driving gear wheel, when the cutter unit is in operative position, said cutter carrying frame and said cutter unit being provided with coöperating parts for engaging each other to hold the cutter unit in position with said pinion and gear in proper mesh, and means for securing said cutter unit in said cutter carrying frame.

21. In a lawn mower, the combination with the cutter carrying frame, provided with means for supporting a cutter unit, and driving gearing including a driving gear wheel, of a demountable cutter unit, comprising a stationary knife, a rotary cutter and a framing holding said knife and cutter at all times in operative relation with each other, a pinion connected with said rotary cutter and adapted to engage said driving gear wheel, when the cutter unit is in operative position, adjustable stops on said cutter carrying frame for engaging the cutter unit, for holding the same in such position that the said pinion and gear wheel are in proper mesh, and independent means for securing said cutter unit in said cutter carrying frame.

22. In a lawn mower, the combination with the cutter carrying frame, provided with means for supporting a cutter unit, and driving gearing including a driving gear wheel, of a demountable cutter unit, comprising a stationary knife, a rotary cutter and a framing holding said knife and cutter at all times in operative relation with each other, a pinion connected with said rotary cutter and adapted to engage said driving gear wheel, when the cutter unit is in operative position, stops for limiting the relative movement of the cutter unit with respect to the cutter carrying frame in placing the latter in position, and holding the parts in such position that the said pinion and gear wheel are in proper mesh, means for connecting the cutter unit rigidly to the cutter carrying frame, and an auxiliary device connecting said frame and the cutter unit adjacent to said pinion and gear wheel for holding them in proper mesh.

23. In a lawn mower, the combination with the cutter carrying frame, provided with means for supporting a cutter unit, and driving gearing including a driving gear wheel, of a demountable cutter unit, comprising a stationary knife, a rotary cutter and a framing holding said knife and cutter at all times in operative relation with each other, a pinion connected with said rotary cutter and adapted to engage said driving gear wheel, when the cutter unit is in operative position, adjustable stops on said cutter carrying frame to engage the cutter unit and hold the said pinion carried thereby in proper mesh with the said gear wheel, means for connecting the cutter unit to the cutter carrying frame, and an adjustable stretcher connecting the said frame and the cutter unit adjacent to said pinion and gear wheel, for holding them in proper mesh.

In testimony whereof I affix my signature, in the presence of two witnesses.

WILLIAM H. COLDWELL.

Witnesses:
 W. H. CHADWICK,
 H. W. MURTFELDT.